United States Patent [19]
Jerabek et al.

[11] Patent Number: 5,892,460
[45] Date of Patent: Apr. 6, 1999

[54] LOGGING WHILE DRILLING TOOL WITH AZIMUTHAL SENSISTIVITY

[75] Inventors: Al Jerabek; Roland E. Chemali, both of Houston, Tex.

[73] Assignee: Halliburton Energy Services, Inc., Houston, Tex.

[21] Appl. No.: 812,216

[22] Filed: Mar. 6, 1997

[51] Int. Cl.⁶ ...................................................... G01V 3/00
[52] U.S. Cl. ...................... 340/856.4; 324/342; 324/346
[58] Field of Search ................................... 324/342, 333, 324/338, 339, 346; 340/856.4

[56] References Cited

U.S. PATENT DOCUMENTS

| | | | |
|---|---|---|---|
| 4,712,070 | 12/1987 | Clark et al. ............................... | 324/338 |
| 4,786,874 | 11/1988 | Grosso et al. ............................ | 324/369 |
| 5,045,795 | 9/1991 | Gianzero et al. ........................ | 324/342 |
| 5,530,358 | 6/1996 | Wisler et al. ............................ | 324/338 |
| 5,654,639 | 8/1997 | Locatelli et al. ........................ | 324/339 |

*Primary Examiner*—J. Woodrow Eldred
*Attorney, Agent, or Firm*—Conley, Rose & Tayon, P.C.

[57] ABSTRACT

An azimuthally sensitive LWD tool is disclosed, comprising a transmitting antenna, a receiving antenna, wherein the receiving antenna is azimuthally focused so as to be more sensitive to changes in magnetic flux in a particular azimuthal segment of the antenna and means for measuring current induced in the receiving antenna as a result of current flowing through said transmitting antenna.

13 Claims, 6 Drawing Sheets

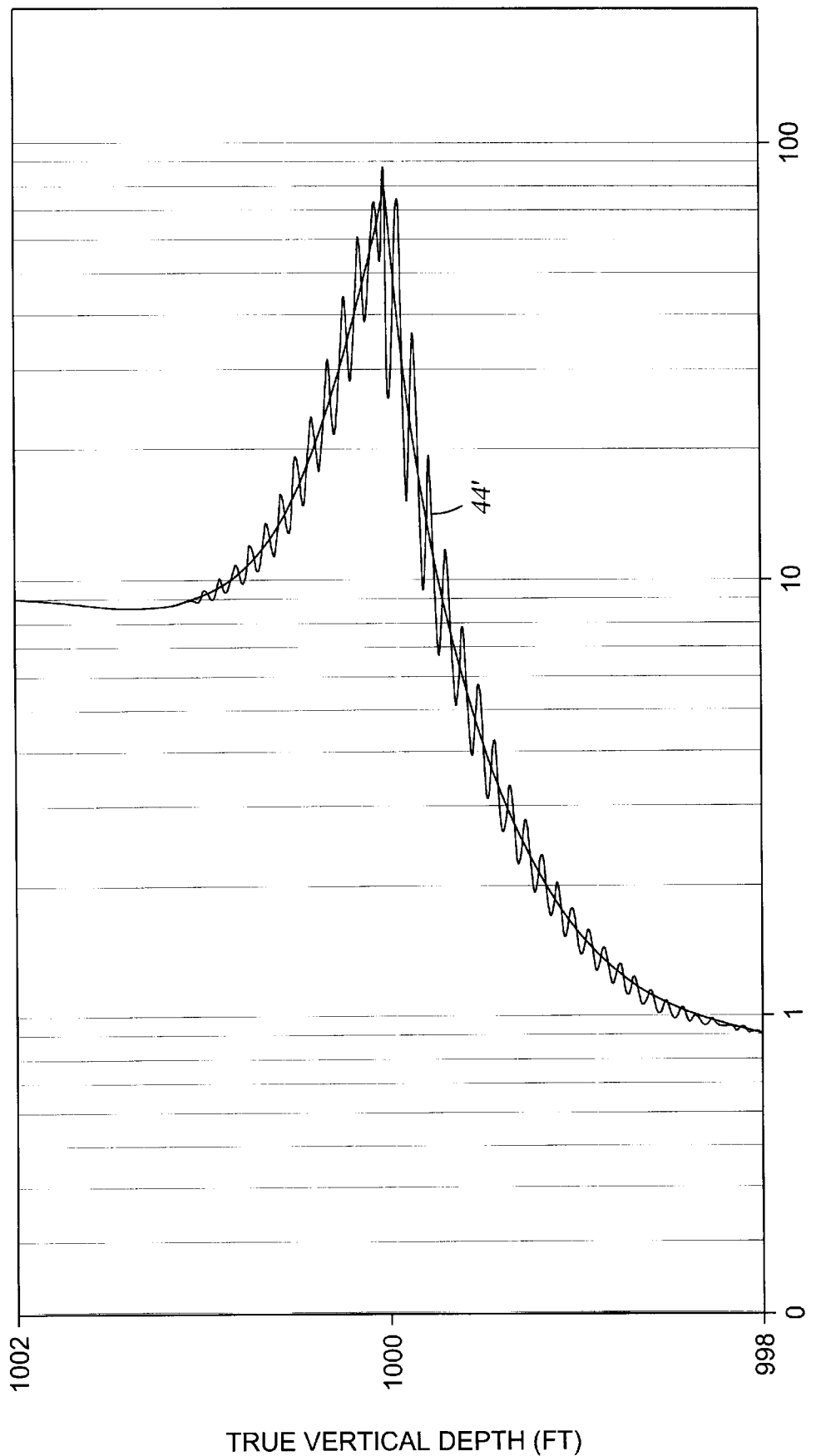

LOGGING WHILE DRILLING TOOL WITH AZIMUTHAL SENSISTIVITY

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD OF THE INVENTION

The present invention relates generally to resistivity logging tool for measuring formation resistivity parameters during drilling. More particularly, the present invention comprises an azimuthally sensitive resistivity tool to facilitate bed boundary detection during drilling. Still more particularly, the present invention comprises a resistivity tool that includes an antenna asymmetrically mounted on a drill collar.

BACKGROUND OF THE INVENTION

Modern petroleum drilling and production operations demand a great quantity of information relating to parameters and conditions downhole. Such information typically includes the location and orientation of the wellbore and drilling assembly, earth formation properties, and drilling environmental parameters downhole. Directional information relating to surveying the location of the wellbore, and controlling or "steering" the drilling assembly, will be discussed later.

The collection of information relating to formation properties and conditions downhole, commonly referred to as "logging," can be performed by several methods. Oil well logging has been known in the industry for many years as a technique for providing information to a driller regarding the particular earth formation being drilled. In conventional wireline logging, a probe or "sonde" housing formation sensors is lowered into the borehole after some or all of the well has been drilled, and is used to determine certain characteristics of the formations traversed by the borehole. The sonde is supported by a conductive wireline, which attaches to the sonde at the upper end. Power is transmitted to the sensors and instrumentation in the sonde through the conductive wireline. Similarly, the instrumentation in the sonde communicates information to the surface by electrical signals transmitted through the wireline.

More recently, the industry has placed an increased emphasis on the collection of data during the drilling process itself. By selecting and processing data during the drilling process, without the necessity of removing or tripping the drilling assembly to insert a wireline logging tool, the driller can make accurate modifications or corrections on-the-fly, as necessary, to optimize performance. Designs for measuring conditions downhole and the movement and location of the drilling assembly, contemporaneously with the drilling of the well, have come to be known as "measurement-while drilling" techniques, or "MWD." Similar techniques, concentrating more on the measurement of formation parameters, commonly have been referred to as "logging while drilling" techniques, or "LWD." While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Ordinarily, a well is drilled vertically for at least a portion of its depth. The layers or strata that make up the earth's crust are generally substantially horizontal. Therefore, during vertical drilling, the well is substantially normal to the geological formations through which it passes One of the properties of the formation that is commonly logged is its resistivity. LWD tools that are designed to measure the resistivity of the surrounding formation need not be azimuthally focused, as the formation in question surrounds the wellbore and is essentially the same in all directions. Thus the rotation of the LWD tool with the bit has no significant effect on the measured resistivity. For this reason, typical LWD resistivity tools that are adapted for use in vertical wells are azimuthally symmetric and have no azimuthal sensitivity.

In certain applications, however, such as when drilling from an off-shore platform, or when drilling through formations in which the reservoir boundaries extend vertically, it is desirable to drill wells that are oriented more horizontally. When drilling horizontally, it is desirable to maintain the well bore in the pay zone (the formation which contains hydrocarbons) as much as possible so as to maximize the recovery. Formations, however, may dip or divert, making it difficult to stay within the boundaries of the desired formation. Thus, while attempting to drill and maintain the well bore within a particular formation, the drill bit may approach a bed boundary. As the rotating bit approaches the bed boundary, the bed boundary will be on one side of the bit axis, or in one azimuthal range with respect to the bit axis.

If a near-bit resistivity tool were capable of sensing resistivity values azimuthally, the sensed values could be analyzed to discern the direction of the bed boundary. If the tool were sufficiently sensitive, the approaching bed boundary would be detected in sufficient time to allow the driller to make corrections in accordance with known techniques to avoid exiting the desired formation.

Various devices have been proposed for measuring resistivity azimuthally. For example, U.S. Pat. No. 4,786,874 describes a resistivity measuring tool which uses an asymmetrical generation of current in the formation by a current electrode placed on one side of the drill collar and the sensing of asymmetrical voltage distribution in the formation by a voltage sensing electrode, with both electrodes placed on an insulated section of the drill collar. Another tool for providing azimuthally sensitivity resistivity measurements is set out and described in U.S. Pat. No. 5,045,795. This tool provides a pair of toroids on which four coils are mounted. The two toroids are connected by magnetic shorting bars. The coil segments and shorting bars inscribe a specific solid angle or azimuth. By connecting the outputs of the several coils through a combining circuit, the coils on a single coil supporting form can be connected in a series, additive or subtractive relationship. Through the use of two such coil forms with the line coils on each, an azimuthally oriented window is thereby defined.

Neither of these prior art systems, however, will work in synthetic drilling muds or oil based muds (non-conductive muds). Hence, it is desirable to provide an LWD tool that allows azimuthally sensitive resistivity measurements, that is easy to manufacture and assemble and that is sufficiently durable and reliable in the drilling environment.

SUMMARY OF THE INVENTION

The present invention comprises a resistivy measurement tool having an azimuthally sensitive receiving antenna. The sensitivity of the antenna is azimuthally focused by providing an eccentric distribution of magnetic flux within the area encircled by the antenna. This is accomplished by providing a larger gap between one portion of the antenna and the conducting drill collar than is provided between the rest of the antenna and the drill collar. This in turn is preferably accomplished by removing a sector of the drill collar within the circumference of the antenna, or by positioning the antenna eccentrically on the drill collar. The eccentric distribution of magnetic flux within the area encircled by the antenna results in the antenna being more sensitive to the resistivity in the azimuthal direction corresponding to the region encompassing the greatest magnetic flux. Thus, even with a radially symmetric transmitting antenna, the receiving antenna of the present invention generates an azimuthally sensitive signal that allows steering of the drill bit so as to maintain the borehole within the desired formation.

BRIEF DESCRIPTION OF THE DRAWINGS

For an introduction to the detailed description of the preferred embodiments of the invention, reference will now be made to the accompanying drawings, wherein:

FIG. 6 is a plot of resistivity measurements made by an azimuthally sensitive tool while the drill bit approaches and traverses a bed boundary.

DETAILED DESCRIPTION OF THE PREFERRED EMBODIMENT

Figure 1:
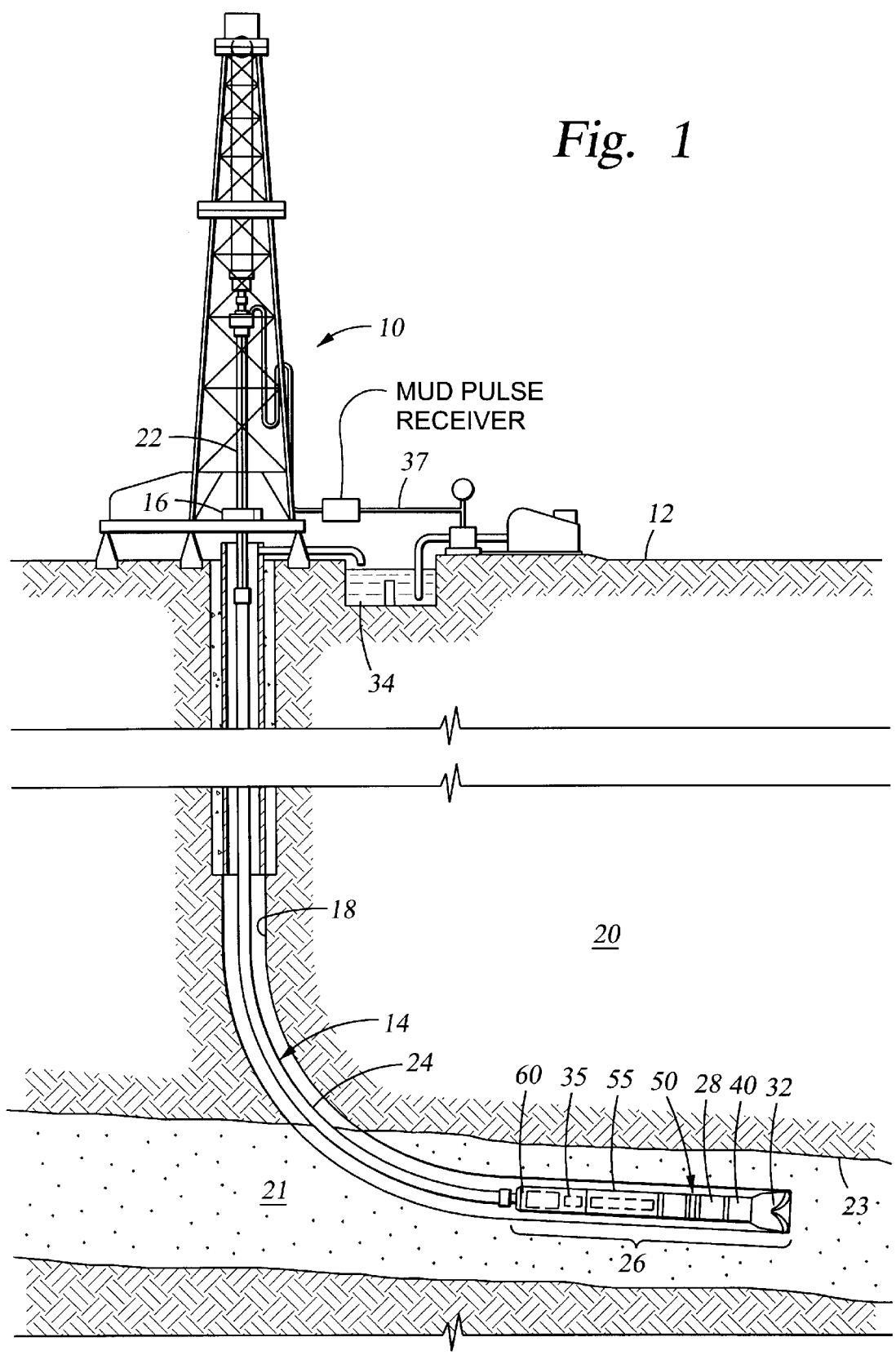
FIG. 1 is a schematic view of a deviated well and drill string incorporating an LWD tool.

Referring now to FIG. 1, a typical drilling installation is illustrated which includes a drilling rig 10, constructed at the surface 12 of the well, supporting a drill string 14. The drill string 14 penetrates through a rotary table 16 and into a borehole 18 that is being drilled through earth formations 20 and 21. The drill string 14 includes a kelly 22 at its upper end, drill pipe 24 coupled to the kelly 22, and a bottom hole assembly 26 (commonly referred to as a "BHA") coupled to the lower end of the drill pipe 24. The BHA 26 typically includes a drill bit 32, a downhole motor 40, at least one drill collar 28, an azimuthally sensitive resistivity tool 50 mounted on collar 28 as described in detail below, MWD sensors positioned in a separate collar section 55, directional MWD sensors located in a non-magnetic section 60, and one or more stabilizer(s) (not shown) for penetrating through earth formations to create the borehole 18. In operation, the kelly 22, the drill pipe 24 and the BHA 26 are rotated by the rotary table 16. The drill collar 28, which also may be non-magnetic so as not to interfere with the MWD measurements, is used, in accordance with conventional techniques, to add weight to the drill bit 32 and to stiffen the BHA 26, thereby enabling the BHA 26 to transmit weight to the drill bit 32 without buckling. The weight applied through the drill collars 28 to the bit 32 permits the drill bit to penetrate underground formations.

As the drill bit 32 operates, drilling fluid or mud is pumped from a mud pit 34 at the surface through the kelly hose 37, into the drill pipe 24, to the drill bit 32. After flowing through the drill bit 32, the drilling fluid rises back to the surface through the annular area between the drill pipe 24 and the borehole 18, where it is collected and returned to the mud pit 34 for filtering. The drilling fluid is used to lubricate the drill bit 32 and to remove cuttings from the borehole 18. As one skilled in the art will realize, the downhole motor or turbine 40 may be used downhole to rotate the drill bit 32 as an alternative, or in addition to, rotating the drill string from the surface.

As shown in FIGS. 1, BHA 26 typically is defined as all of the downhole components from the top of the drill collars 28, down to the drill bit 32, including downhole motor 40. As one skilled in the art will understand, downhole motor 40 is an optional component, which may be omitted from the BHA 26 if desired. In the preferred embodiment, the BHA 26 preferably includes a measurement while drilling system, referred to herein as an "MWD system."

As is known in the art, an MWD system typically includes directional MWD sensors housed in the non-magnetic sub 60 (or drill collar), drilling parameter sensors such as weight-on-bit (WOB), torque-on-bit (TOB), shock, vibration, etc., and other, formation sensors. The formation sensors preferably include the present azimuthally sensitive resistivity sensor, as well as gamma, sonic, density and neutron sensors in accordance with normal industry practice, and See generally "State of the Art in MWD," International MWD Society (Jan. 19, 1993). A downhole controller (not shown) preferably controls the operation of a signaling unit 35 and orchestrates the operation of the MWD sensors and components. The controller may be located in sub 60 or elsewhere in the BHA 26.

Still referring to FIG. 1, downhole data signaling unit 35 is preferably provided as part of BHA 26 and is used to transmit sensed values to a surface receiver via a mud pulse acoustic signal. In addition, the downhole system may also include the capability of receiving mud pulse signals from the surface to control the operation or activation of certain MWD sensors or other downhole components. The signaling unit 35 in the preferred embodiment comprises a mud pulser unit housed in a non-magnetic sub in accordance with conventional industry practice.

Further in accordance with industry practice, the downhole controller may include appropriate data encoding circuitry, such as an encoder, which sequentially produces encoded digital data electrical signals representative of the measurements obtained by the formation sensors and directional sensors. In addition, the controller processes the data received from the sensors and produces encoded signals indicative of a portion or all of the received signals for transmission to the surface via a mud pulse signal. The controller also may make decisions based upon the processed data.

In many cases, the lower end of the borehole is deviated substantially from vertical, as shown in FIG. 1, 50 as to extend the length of its passage through an oil-bearing formation such as 21. Thus, it is desirable to provide a tool capable of detecting and locating bed boundaries such as 23. Although in FIG. 1 BHA 26 is deviated approximately 900 from vertical, it will be understood that the present invention can be used to advantage in any similar situation wherein it is desired to locate a bed boundary 23 that is located to one side, rather than ahead, of collar 28.

Resistivity tools are generally known in the art and comprise a pair of antennas, one of which transmits while the other receives. Current resistivity tools are typically induction tools, in that they measure the resistivity of the formation by measuring the level of current induced in the receiving antenna as a result of magnetic flux caused by current in the emitting antenna. Specifically, an alternating current with a constant intensity is fed to the emitting coil or antenna. Current flow through the emitting coil induces currents in the formation that flow in coaxial loops around the tool. These currents in turn induce a signal in the receiving coil. This signal induced in the receiving coil can be measured and is proportional to the conductivity of the formation.

Figure 2:
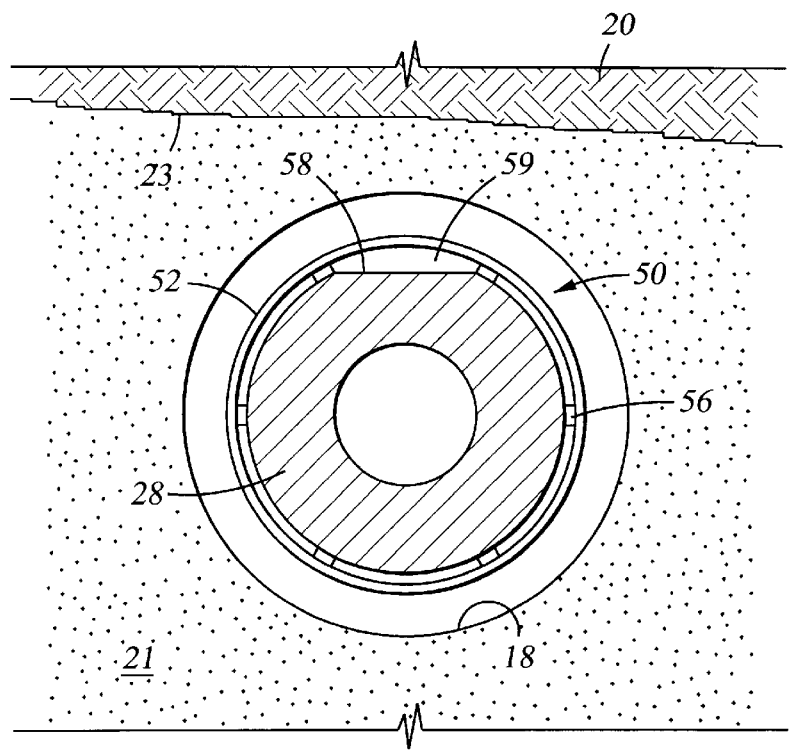
FIGS. 2 and 2A are cross sectional and side views of a first embodiment of the azimuthally sensitive antenna constructed in accordance with the principles of the present invention.
Figure 2A:
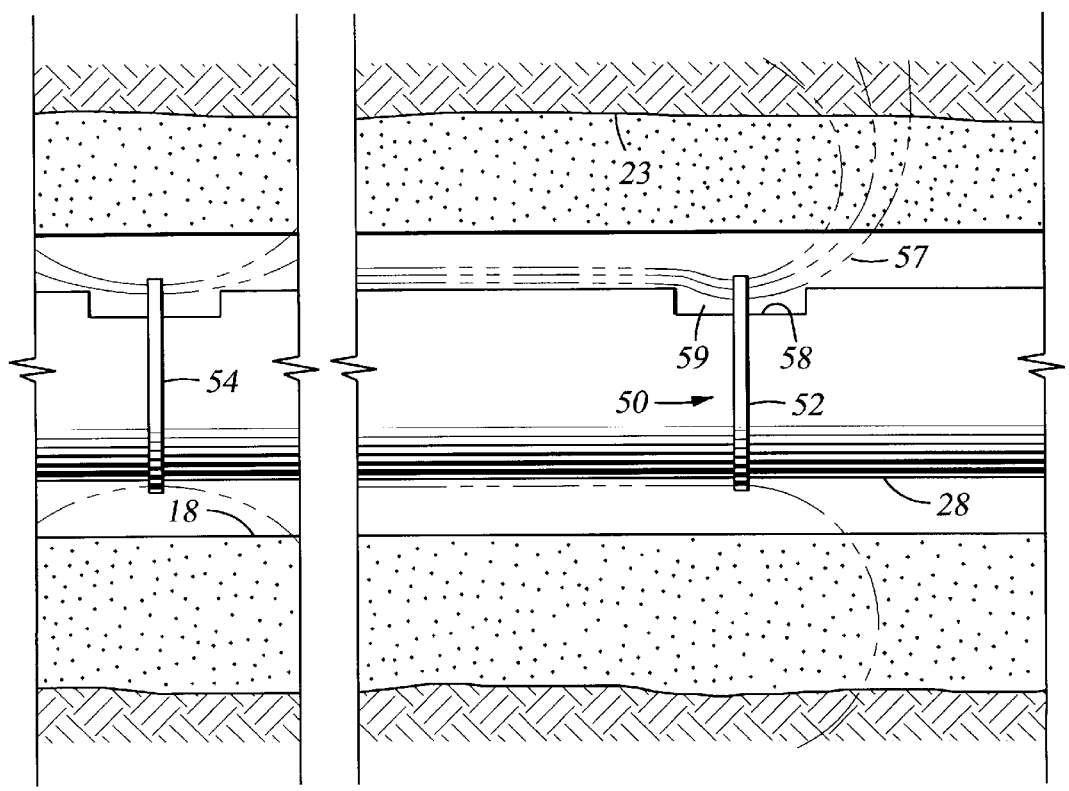

Referring now to FIGS. 2 and 2A, the signal receiving portion of the present azimuthally sensitive logging tool 50 is shown centered in borehole 18. This portion of tool 50 comprises a receiving antenna coil 52, which is formed around and spaced apart from drill collar 28. Coil 52 is supported in this relationship to drill collar 12 by a plurality of insulating spacers 56. A portion of drill collar 28 is removed, so that its outer surface is no longer circular, but includes a planar portion 58. Planar portion 58 preferably extends in an axial direction only a few inches or less on either side of antenna 52. Removal of a portion of the drill collar in this manner forms a wider gap 59 between antenna coil 52 and drill collar 28 adjacent planar portion 56. Gap 59 in turn allows for increased magnetic flux 57 through this azimuthal sector of the antenna. For this reason, antenna coil 52 is more sensitive to changes in resistivity on the side of the formation adjacent to gap 59 than it is to changes near other sectors of coil 52. It is preferred in this embodiment that the azimuthally asymmetric portion of the drill collar from which a portion has been removed encompass an azunuthal sector of approximately 45 degrees The azimuthal extent of the asymmetric sector may vary from approximately 10 degrees to 180 degrees, so long as it is sufficiently great to generate an oscillating signal in the vicinity of a region of differing conductivity and small enough to accurately locate the bed boundary.

According to a preferred embodiment, the transmitting antenna 54 (FIG. 2A) used in conjunction with receiving antenna 52 is positioned on drill collar 28 some axial distance from receiving antenna coil 52. Transmitting antenna 54 is preferably constructed in the same manner as receiving antenna 52 and therefore will not be described separately. The azimuthally asymmetric sector of transmitting antenna 54 is preferably azimuthally aligned with the azimuthally asymmetric sector of receiving antenna 52. The azimuthal asymmetry allows transmitting antenna 54 to focus its energy on the same sector of the formation that is being inspected by receiving antenna 52. It will be understood that the principles of the present invention would apply equally to a tool in which only one, rather than both, of the antennas were azimuthally asymmetric, although this mode is not presently preferred.

Figure 3:
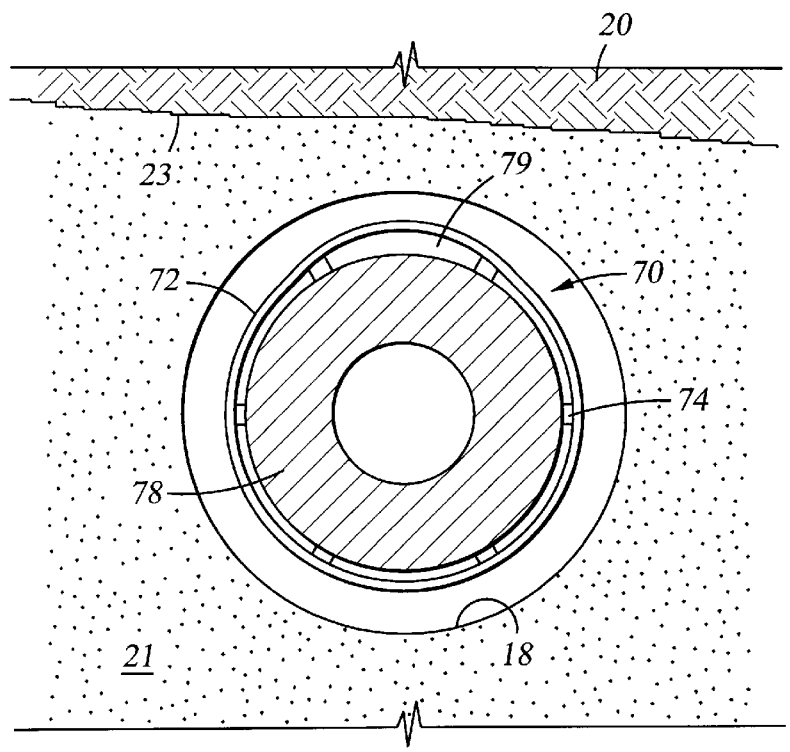
FIGS. 3 and 3A are cross sectional and side views of a second embodiment of the azimuthally sensitive antenna constructed in accordance with the principles of the present invention.
Figure 3A:
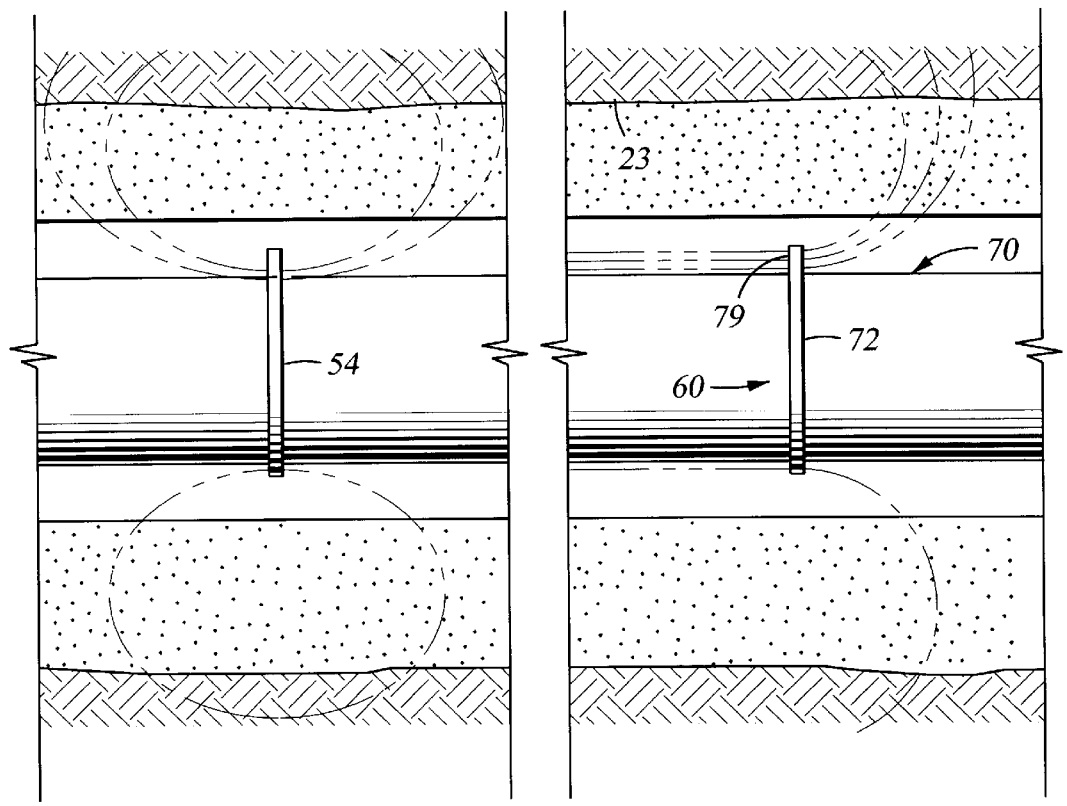

Referring now to FIGS. 3 and 3A, an alternative embodiment 70 of the present logging tool includes an antenna coil 72 that is eccentrically mounted on a cylindrical drill collar 78. One or both of the transmitting and receiving antennas can be constructed in this manner. Coil 72 is supported on drill collar 78 by a plurality of insulating spacers 74. Coil 72 may be either circular or non-circular, provided it encircles a larger gap between it and drill collar 78 in one azimuthal segment than in other azimuthal segments. This larger gap provides an eccentric region of increased magnetic flux 79 in one azimuthal sector of the antenna similar to that created by gap 59 in FIG. 2. The embodiment shown in FIGS. 3 and 3A allows use of an unmodified conventional drill collar, which may be advantageous when it is desired to utilize pre-existing equipment.

In any case, one embodiment of the antenna of the present invention has a radial distance between the drill collar and the antenna that is approximately twice as great at its greatest point as it is at its smallest point. For example, for an eccentrically mounted antenna such as that shown in FIGS. 3 and 3A, the greatest distance between the drill collar and the antenna might be 0.5 inches, while the same space might measure only 0.25 at its smallest. It will be understood that these numbers are given by way of illustration only and are not intended to limit the scope of the invention.

In both embodiments, the receiving antenna 52, 72 is connected to sensing circuitry which is in turn connected to a controller that processes the data received from the sensors and produces signals indicative of the resistivity measurements for transmission to the surface via telemetry transmitter 35. Telemetry transmitter 35 can use any of several known techniques for transmitting information to the surface, including but not limited to (1) mud pressure pulse; (2) hard-wire connection; (3) acoustic wave; and (4) electromagnetic waves.

In a typical mud pressure pulse system, the drilling mud pressure in the drill string is modulated by means of a valve and control mechanism mounted in a special pulser collar above the drill bit and motor (if one is used). The pressure pulse travels up the mud column at or near the velocity of sound in the mud, which is approximately 4000–5000 feet per second. The rate of transmission of data, however, is relatively slow due to pulse spreading, modulation rate limitations, and other disruptive forces, such as the ambient noise in the drill string. A typical pulse rate is on the order of a pulse per second. A representative example of mud pulse telemetry systems may be found in U.S. Pat. Nos. 3,949,354, 3,964,556, 3,958,217, 4,216,536, 4,401,134, 4,515,225, 4,787,093 and 4,908,804.

Figure 4:
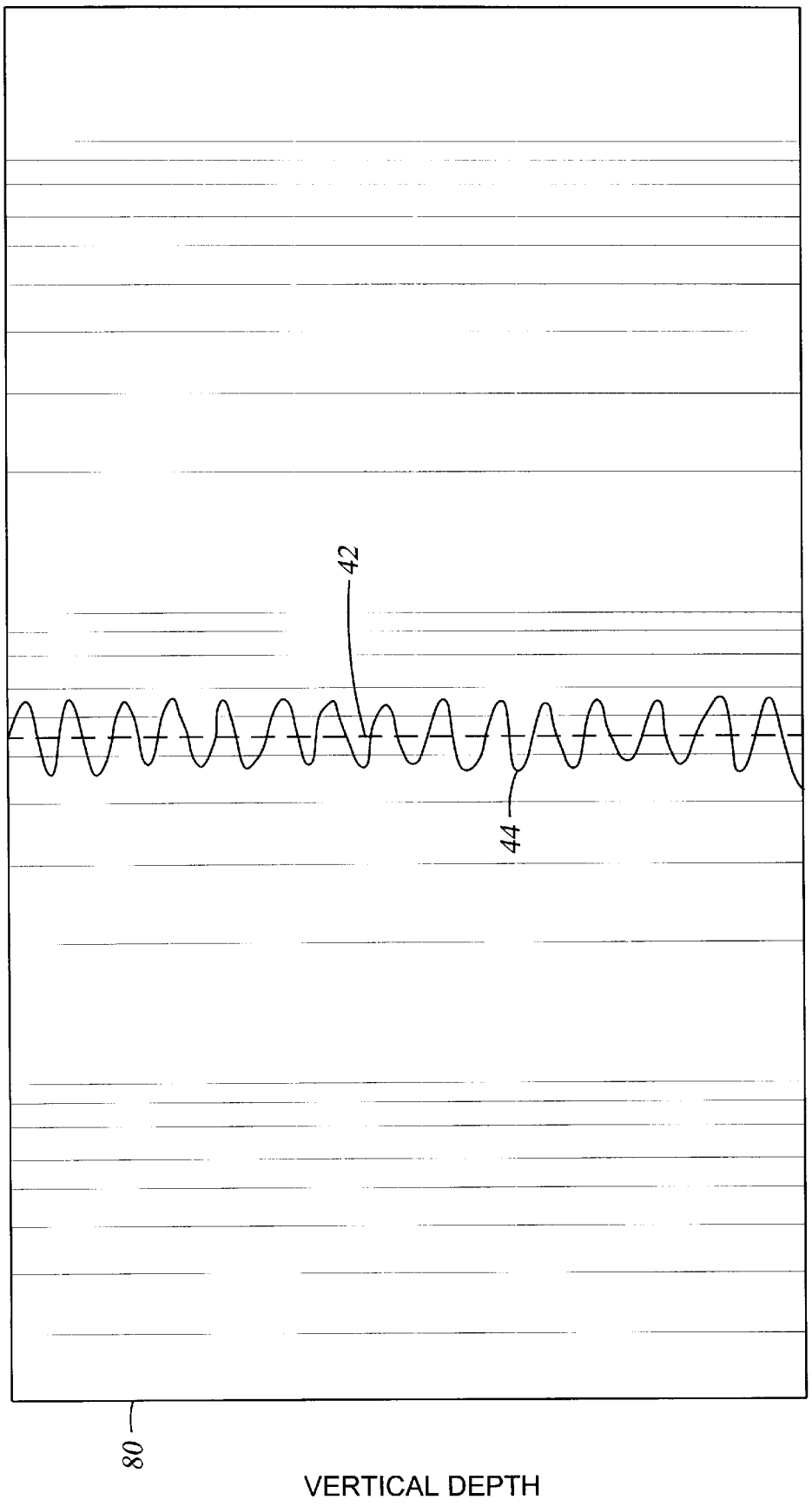
FIG. 4 is a comparative plot of resistivity measurements made by an azimuthally symmetric tool and an azimuthally sensitive tool while the drill bit is substantially parallel to a bed boundary.

Referring now to FIG. 4, comparative resistivity plots with and without azimuthal sensitivity are super-imposed. In FIG. 4 the tool is close enough to detect a bed boundary but is moving parallel to the bed boundary and therefore neither approaching nor departing from it. A plot 80 of the nominal or measured resistivity as determined by a conventional, azimuthally symmetric tool is shown in phantom. Because it does not detect directional variation in the measured resistivity, plot 80 is essentially linear. A plot of the resistivity measured by a tool having azimuthal sensitivity according to the present invention is indicated by 44. Because the azimuthal sensitivity of the tool causes it to "see" a different resistivity value when it is oriented toward the bed boundary and because the bit rotates as it advances, plot 44 is sinusoidal. On the other hand, the amplitude and average value of plot 44 remain constant because the bit is neither approaching nor departing from a bed boundary but is maintaining a substantially constant distance from the bed boundary.

Figure 5:
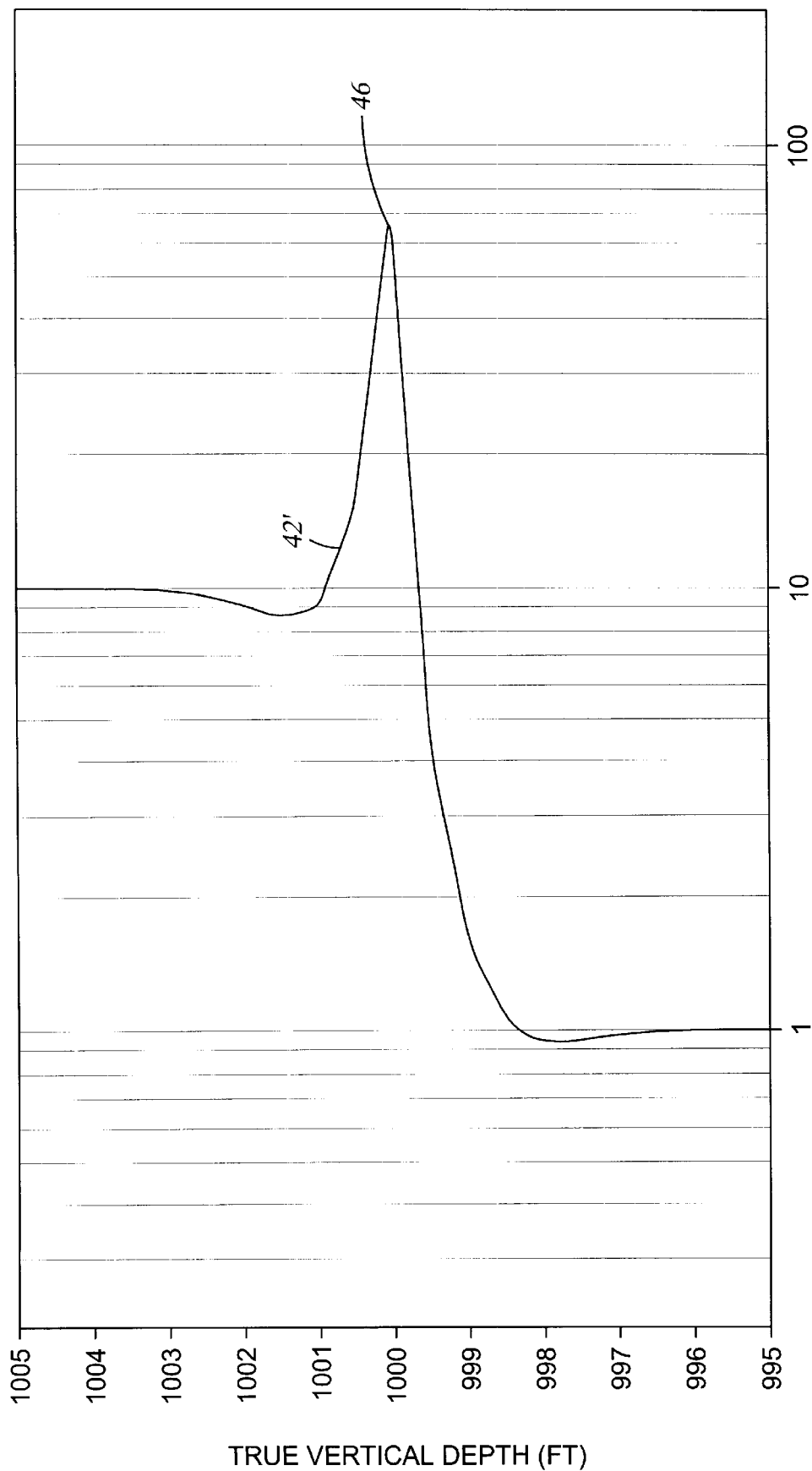
FIG. 5 is a plot of resistivity measurements made by an azimuthally symmetric tool while the drill bit approaches and traverses a bed boundary.

FIG. 5 shows the resistivity measured by a non-azimuthally sensitive tool as the bit approaches and passes through a bed boundary between an upper layer having a resistivity$_{tupper}$ of approximately 1 Ohm~meters ($\Omega$.m) and a lower formation having a resistivity$_{tlower}$ of approximately 10 Ω.m. As can be seen in FIG. 5, plot 48 includes a peak 46, at which the measured resistivity is well above the resistivity of even the more resistive formation (>10 Ω.m). The information in FIG. 5 gives the measured resistivity for both the upper and lower formation, provided the data are taken from points sufficiently distant from the anomalous peak effect in the vicinity of the bed boundary.

Likewise, drilling operators using the data plotted in FIG. 5 are able to detect the approach of a bed boundary when the measured resistivity changes and to detect passage of the bit through the bed boundary when peak 46 is detected. However, because the tool whose plot is shown in FIG. 5 lacks azimuthal sensitivity, the information available therefrom is of limited value. Specifically, it is impossible to discern in which direction an approaching bed boundary lies. Without this information, the mechanical ability to steer the bit is useless unless a trial and error approach is adopted.

Referring now to FIG. 6, an enlarged plot 50 of the measurements taken by an azimuthally sensitive resistivity tool as the bit approaches and passes through a bed boundary show the sinusoidal oscillation that results from the azimuthal sensitivy. It should be noted that in regions where the distance between the tool and the bed boundary is great enough to prevent detection of the bed boundary by the azimuthally sensitive tool, plot 50 is not sinusoidal in character (such as below 1,001 feet in the Figure). Thus, the earliest indication of an approaching bed boundary is an increase in the amplitude of the oscillations from zero. Likewise, the amplitude of the oscillations gives an indication of the proximity of the bed boundary, although the maximum amplitude that will be measured is limited by the difference in resistivities between the two sides of the antenna. The range of the tool is approximately 18 inches, so oscillations in the resistivity signal will begin to be detected when the tool is within 18 inches of a bed boundary.

The present tool uses a conventional inclinometer sensing system or toolface system, in combination with a mark on the measurement sub to calculate real rotational position of the azimuthally sensitive portion of the antenna. Thus, in regions where the amplitude of the sinusoidal oscillation of the measured resistivity is great enough to allow detection, the precise position of the approaching bed boundary with respect to the bit and bit path is known, as well as the true orientation of both the bit and antenna. With this information the drill bit can be easily steered away from the bed boundary, preferably to a sufficient distance that the amplitude of the oscillations again returns to zero.

Because of the azimuthal sensitivity of the measurement, any non-symmetrical anomaly, such as an approaching boundary or a nearby casing will be detected by the present tool, which will give an indication of the direction of approach. Thus, the present tool allows true steering of the drilling sub, based on information about the surrounding formation and bed boundaries.

The present tool is particularly useful in the case of oil based muds or low impedance muds. This is because direct resistivity measurements are not practical in oil based muds, which provide a layer of electrical insulation around the tool.

While the present invention has been described and disclosed in terms of a preferred embodiment, it will be understood that variations in the details thereof can be made without departing from the scope of the invention. For example, the eccentric antenna can be configured in a variety of non-circular shapes, the transmitting antenna can optionally be made eccentric in a similar manner so as to enhance the azimuthal asymmetry, or the antenna could be mounted on something other than the drilling sub.

What is claimed is:

1. An azimuthally sensitive LWD tool, comprising:
   a transmitting antenna;
   a receiving antenna, at least one of said transmitting and receiving antennas being focused so as to be more sensitive to changes in magnetic flux in an azimuthally sensitive sector of said antenna, said azimuthally focused antenna including a coil having an eccentric distribution of magnetic flux therethrough, said coil being mounted on a drill collar and said drill collar including an azimuthally asymmetric sector from which a portion of the outer surface of said drill collar has been removed, said azimuthally asymmetric sector of said drill collar including a substantially planar outer surface; and
   means for measuring current induced in said receiving antenna as a result of current flowing through said transmitting antenna.

2. The LWD tool according to claim 1 wherein said azimuthally asymmetric sector encompasses between approximately 10 and approximately 180 degrees of the circumference of said drill collar.

3. The LWD tool according to claim 2 wherein said azimuthally asymmetric sector encompasses approximately 45 degrees.

4. An azimuthally sensitive LWD tool, comprising:
   a transmitting antenna;
   a receiving antenna, at least one of said transmitting and receiving antennas being focused so as to be more sensitive to changes in magnetic flux in an azimuthally sensitive sector of said antenna, said azimuthally focused antenna including a coil having an eccentric distribution of magnetic flux therethrough, said coil being mounted on a drill collar at a distance from said drill collar, said distance varying between a maximum distance within said azimuthally sensitive sector and a minimum distance outside said azimuthally sensitive sector; and
   means for measuring current induced in said receiving antenna as a result of current flowing through said transmitting antenna.

5. The LWD tool according to claim 4 wherein said maximum distance is approximately twice as great as said minimum distance.

6. An azimuthally sensitive LWD tool, comprising:
   a transmitting antenna;
   a receiving antenna, at least one of said transmitting and receiving antennas being focused so as to be more sensitive to changes in magnetic flux in an azimuthally sensitive sector of said antenna, said azimuthally focused antenna including a coil having an eccentric distribution of magnetic flux therethrough, said coil being asymmetrically mounted on a drill collar at a distance from said drill collar; and
   means for measuring current induced in said receiving antenna as a result of current flowing through said transmitting antenna.

7. The LWD tool according to claim 6 wherein said coil includes an azimuthally sensitive asymmetric sector and said distance between said azimuthally focused antenna and said drill collar in said azimuthally sensitive asymmetric sector is greater than said distance between said azimuthally focused antenna and said drill collar in other sectors.

8. The LWD tool according to claim 7 wherein said drill collar is azimuthally symmetric.

9. The LWD tool according to claim 7 wherein said distance between said azimuthally focused antenna and said drill collar in said azimuthally asymmetric sector is approximately twice as great as said distance between said azimuthally focused antenna and said drill collar in other sectors.

10. The LWD tool according to claim 1 wherein at least one of said transmitting and receiving antennas comprises a coil asymmetrically mounted on said drill collar at a distance from said drill collar.

11. The LWD tool according to claim 10 wherein said coil includes an azimuthally asymmetric sector and said distance between said azimuthally focused antenna and said drill collar in said azimuthally asymmetric sector is greater than said distance between said receiving antenna and said drill collar in other sectors.

12. The LWD tool according to claim 6 wherein said drill collar includes an azimuthally asymmetric sector from which a portion of the outer surface of said drill collar has been removed;

wherein said azimuthally asymmetric sector of said drill collar includes a substantially planar outer surface.

13. The LWD tool according to claim 12 wherein said azimuthally asymmetric sector of said drill collar encompasses approximately 45 degrees of the circumference of said drill collar.

* * * * *